US008422348B2

United States Patent
Liu et al.

(10) Patent No.: US 8,422,348 B2
(45) Date of Patent: Apr. 16, 2013

(54) REPRODUCING SYSTEM FOR MEDIUMS AND METHOD FOR REPRODUCING DIGITAL DATA AND IDENTIFYING THE SAME

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 0 days.

(21) Appl. No.: 13/530,469

(22) Filed: Jun. 22, 2012

(65) Prior Publication Data

US 2012/0263028 A1 Oct. 18, 2012

Related U.S. Application Data (63) Continuation-in-part of application No. 13/084,073, filed on Apr. 11, 2011, now Pat. No. 8,279,735.

(51) Int. Cl.
G11B 7/28 (2006.01)

(52) U.S. Cl.
USPC .......................................... 369/84; 369/30.05

(58) Field of Classification Search .................. 369/84, 369/30.4, 30.05, 47.12, 47.13, 47.22, 53.31; 711/111–114, 161, 162, 165, 171, 172; 386/279, 386/286, 326
See application file for complete search history.

(56) References Cited

U.S. PATENT DOCUMENTS

| | | | |
|---|---|---|---|
| 6,226,241 B1 | 5/2001 | D'Amato et al. | |
| 6,529,452 B2 | 3/2003 | Tabuchi et al. | |
| 6,560,174 B1 | 5/2003 | Takenaka | |
| 6,678,229 B1* | 1/2004 | James | 369/53.11 |
| 6,680,880 B1* | 1/2004 | Ripoll-Ensenat et al. | 369/30.16 |
| 6,885,624 B1* | 4/2005 | La et al. | 369/47.12 |
| 7,196,986 B2 | 3/2007 | Hayakawa et al. | |
| 2004/0035934 A1 | 2/2004 | Miyazawa et al. | |
| 2005/0210071 A1* | 9/2005 | James | 707/104.1 |
| 2006/0044969 A1 | 3/2006 | Kudo et al. | |
| 2006/0159420 A1* | 7/2006 | Kwon | 386/83 |
| 2007/0033219 A1* | 2/2007 | James et al. | 707/102 |
| 2007/0064557 A1* | 3/2007 | Huang | 369/47.12 |
| 2007/0078948 A1 | 4/2007 | Julia et al. | |
| 2007/0088674 A1* | 4/2007 | Kawate et al. | 707/2 |
| 2007/0286049 A1 | 12/2007 | Sasaki | |
| 2009/0060457 A1 | 3/2009 | Mizumori | |
| 2009/0285566 A1* | 11/2009 | Saijo et al. | 386/124 |
| 2011/0249543 A1 | 10/2011 | Kobayashi et al. | |
| 2011/0255389 A1 | 10/2011 | Kudo | |

* cited by examiner

Primary Examiner — Thang Tran
(74) Attorney, Agent, or Firm — Muncy, Geissler, Olds & Lowe, PLLC (57) ABSTRACT

A method for reproducing digital data and identifying the same by executing a software program stored in a memory of a computer is disclosed. The method includes: reading digital data; identifying total size of the digital data; saving the digital data as a temporary file; receiving a request for selecting at least one target medium, wherein the target medium is used for storing the digital data; determining a quantity of the target medium to be used for writing; writing the digital data into the target medium; generating a list text file and an index text file into each target medium, wherein the list text file includes information regarding to the content stored in each target medium respectively and the index text file includes information regarding to the content in all target medium; and building an index database of the digital data.

7 Claims, 7 Drawing Sheets

| DVD-1 | | | | |
|---|---|---|---|---|
| Name | Size | Type | Time | Remark |
| MP3-MUSIC | 138 KB | JPG | 2011/2/25 | |
| 01 - Kryptonite | 9,177 KB | MP3 | 2010/5/17 ... | |
| 02 - Loser | 10,357 KB | MP3 | 2011/2/22 ... | |
| 03 - Duck And Run | 9,019 KB | MP3 | 2009/7/21 ... | |
| 04 - Not Enough | 7,589 KB | MP3 | 2010/5/5 ... | |
| 05 - Be Like That | 10,396 KB | MP3 | 2010/1/14 ... | |
| 06 - Life Of My Own | 9,325 KB | MP3 | 2009/10/21... | |
| 07 - Better Life | 7,343 KB | MP3 | 2010/4/2 ... | |

FIG. 7

| 20120606 batch for DVD-1 ~ DVD-10 ||||||
|---|---|---|---|---|---|
| DVD-1 | | | | | |
| | Name | Size | Type | Time | Remark |
| 01 | Music- Beethoven | 10,357kb | MP3 | 2011/01/05 | |
| ... | ... | ... | ... | ... | |
| | | | | | |
| DVD-2 | | | | | |
| ... | ... | ... | ... | ... | |
| DVD-10 | | | | | |
| ... | ... | ... | ... | ... | |

FIG. 8

REPRODUCING SYSTEM FOR MEDIUMS AND METHOD FOR REPRODUCING DIGITAL DATA AND IDENTIFYING THE SAME

CROSS-REFERENCE

This application is a continuation-in-part (CIP) of application Ser. No. 13/084,073, filed on Apr. 11, 2011 now U.S. Pat. No. 8,279,735. The prior application is herewith incorporated by reference in its entirety.

BACKGROUND OF THE INVENTION

1. Field of the Invention

The present invention relates to a reproducing system for mediums and a method for reproducing digital data and identifying the same.

2. Description of the Related Art

Digital storage of data has been in use for decades. Usually, digital data are stored in different types of storage mediums, such as MO (magnetic optical) discs, CDs (compact discs), LDs (laser discs), DVDs (digital versatile discs) or BDs (blue ray discs). Due to the development of different types of computers, the specifications of the mediums have to comply with the different generations of computers. The various mediums employ different compression technologies, so different types of mediums can store different amounts of digital data.

Most digital storage mediums are made for storing digital data that is read-only. The users may need to re-store their digital data in a new medium to make them editable. Furthermore, almost every medium has limitations on its lifetime. When digital data is stored in a medium for longer than the lifetime, the digital data may become unreadable. As a result, users need to periodically re-store their digital data in a new medium to avoid data loss.

In order to save space, users may wish to use a disk with better compression to replace the old one when re-storing the digital data. For example, generally, one BD can store more than 25 GB of digital data, while one DVD can store 5 GB digital data. Thus, the user may want to use one BD to replace five DVDs when re-storing the data.

After re-writing the digital data into alternative mediums, users may not be able to identify the content of the mediums from the outward appearance of the mediums. Thus, traditionally, it is required to have a label attached on the surface of a medium for users to identify the content of the medium. However, if a user needs to backup his/her digital data by re-storing it into a new medium, the user may need a label printer to apply a label on the surface of the medium. Often, the description on the label, which is very short, has a limited amount of information. If the user needs an index to show the digital data content and the corresponding label, he/she has to build such an index manually.

Normally, the index was saved automatically into a computer that processes the writing of the digital data. However, when the user may want to know a content of a specific batch processed mediums. In other word, the user may want to know a total index of the digital data in each medium after writing so as to identify the mediums.

Therefore, there is a need to provide a reproducing system for mediums and a method for reproducing digital data and identifying the same.

SUMMARY OF THE INVENTION

It is an object of the present invention to provide a reproducing system for mediums. The reproducing system can automatically write digital data into a new medium and generate a list text file and an index text file into each new medium.

It is another object of the present invention to provide a method for reproducing digital data and identifying the same by executing a software program stored in a memory of a computer.

To achieve the abovementioned objects, the present invention provides a reproducing system for mediums comprising a reading module, an identifying module connected with the reading module, a saving module connected with the identifying module, a receiving module connected with the identifying module, a determining module connected with the identifying module and the receiving module respectively, a writing module connected with the determining module and the saving module respectively, an index managing module connected with the writing module, and a building module connected with the index managing module. Preferably, a packaging module connected with the reading module, and a restoring module connected with the writing module, the index managing module, and the building module.

The reading module is used for reading digital data. The identifying module is used for identifying the digital data. The saving module is used for saving the digital data as a temporary file. The receiving module is used for receiving a request to select a target medium, wherein the target medium is used for storing the digital data. The determining module is used for determining a quantity of the target medium. Furthermore, the digital data size of the mediums can also be identified by the identifying module, and the quantity of the target medium can be determined according to the size of the digital data and the size of each target medium. The writing module is used for writing the digital data into the at least one target medium in a specific order.

In the preferred embodiment, the reproducing system for mediums further comprises a building module for building an index database of the digital data. In this embodiment, the index database comprises a file name, a filename extension, a size, a date, a time, an attribute, a type, and a remark. The packaging module is used for packing the digital data into one compressed file. The target medium comprises a CD, a DVD, or a BD.

In addition, the present invention further provides a method for identifying digital data and reproducing the same by executing a software program stored in a memory of a computer, the method comprising:

S1: reading digital data according to a selection from an interface;

S2: identifying total size of the digital data;

S3: saving the digital data as a temporary file;

S4: receiving a request for selecting at least one target medium, wherein the target medium is used for storing the digital data;

S5: determining a quantity of the at least one target medium to be used for writing according to the total size of the digital data and a capacity of each target medium;

S6: writing the digital data into the at least one target medium;

S7: generating a list text file and an index text file into each target medium, wherein the list text file comprises information regarding to the content stored in each target medium respectively and the index text file comprises information regarding to the content in all target medium; and S8: building an index database of the digital data.

In a preferred embodiment, the method further comprises:

S9: restoring the content stored in each target medium respectively into the computer.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
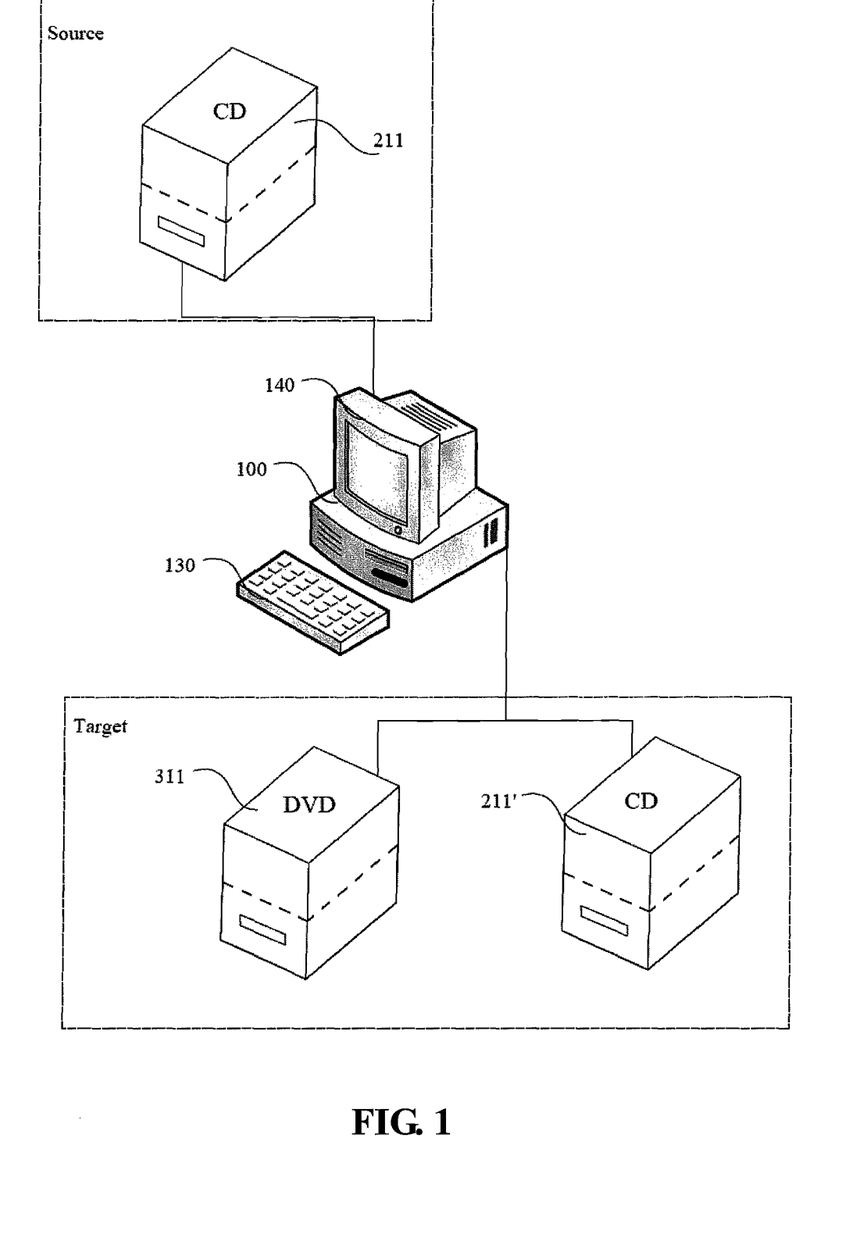
FIG. 1 illustrates an environmental schematic drawing according to an embodiment of the present invention.

Please refer to FIG. 1, which illustrates an environmental schematic drawing according to an embodiment of the present invention, for the following paragraphs. A user utilizes a computer 100 to execute the method of the present invention. The computer 100 is connected with a source medium processing device 211 and two different target medium processing devices 311 and 211' for the user to select. For example, the source medium processing device 211 may be a CD processing device, the target medium processing device 311 can be a DVD processing device, and the target medium processing device 211' can be a CD processing device. Thus, when the user needs to backup his/her old CDs, the user may use the method and the system of the present invention to copy the digital data of the old CDs into the target medium, such as CDs, DVDs, or BDs. The target medium processing device may be an MO reader, a CD processing device, a DVD processing device, a BD processing device, or a multi-functional processing device. Thus, the figures are for illustration only, not for limiting the present invention.

Figure 2:
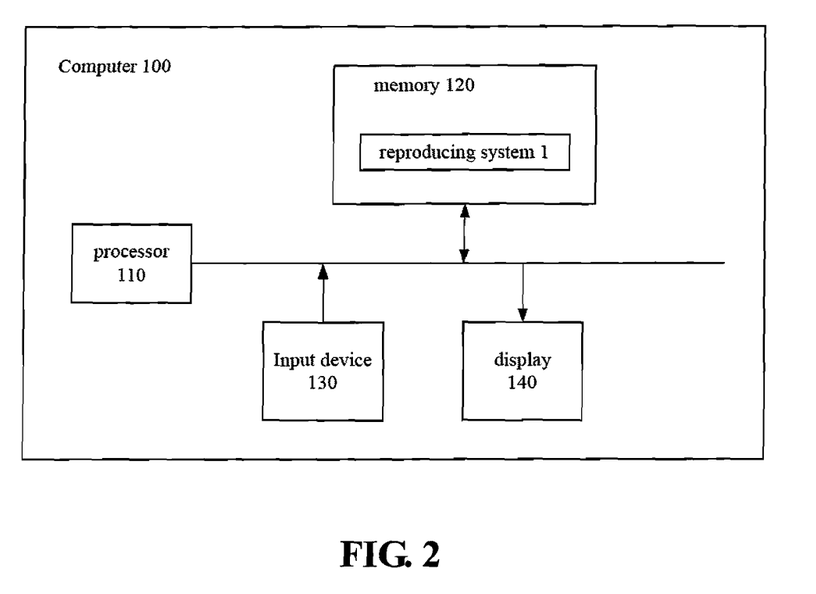
FIG. 2 illustrates a structure of a computer according to the present invention.

As shown in FIG. 2, the computer 100 mainly comprises a processor 110 and a memory 120. The memory 120 stores a reproducing system 1 that can be a software program. In the present invention, the processor 110 executes the reproducing system 1 so as to generate and perform the steps of the present invention.

Figure 3:
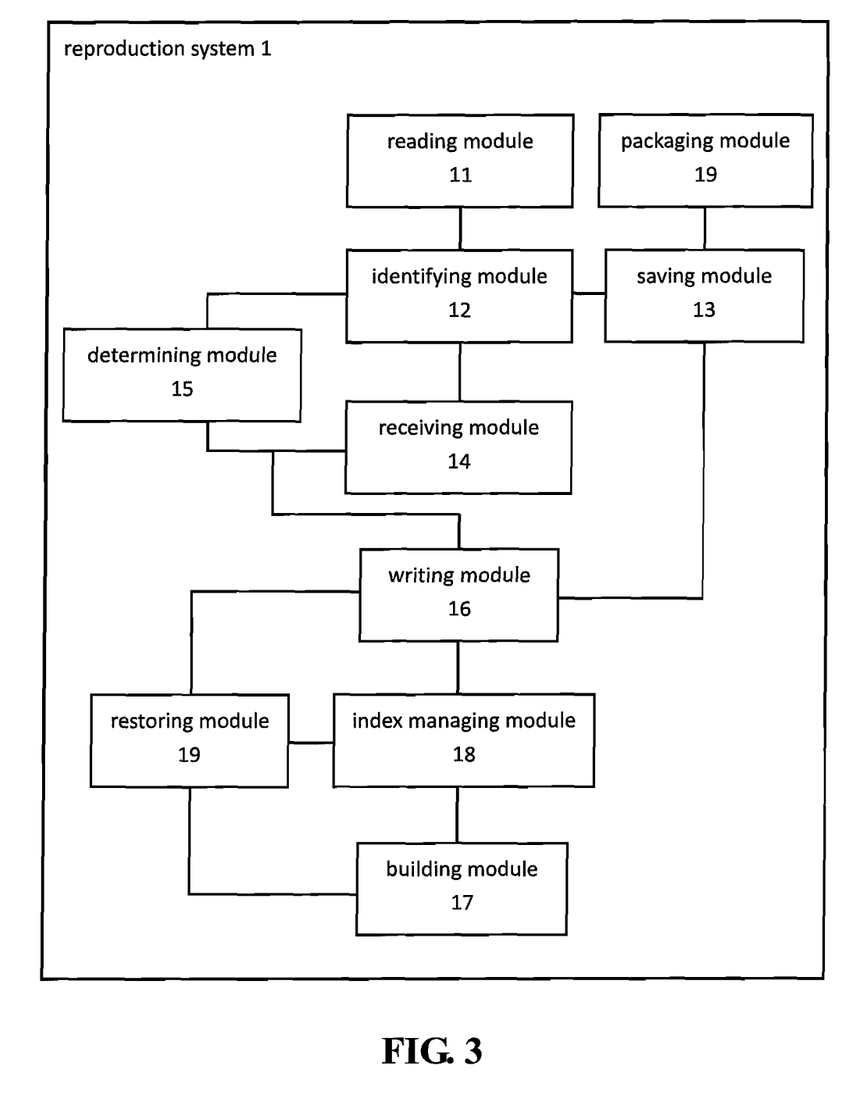
FIG. 3 illustrates a block diagram according to the reproducing system of the present invention.

Please refer to FIG. 3. The reproducing system 1 mainly comprises a reading module 11, an identifying module 12 connected with the reading module 11, a saving module 13 connected with the identifying module 12, a receiving module 14 connected with the identifying module 12, a determining module 15 connected with the identifying module 12 and the receiving module 14 respectively, a writing module 16 connected with the determining module 15 and the saving module 13 respectively, an index managing module 18 connected with the writing module 16, and a building module 17 connected with the index managing module 18. Preferably, a packaging module 19 connected with the reading module 11, and a restoring module 19 connected with the writing module 16, the index managing module 18, and the building module 17.

The reading module 11 is used for reading digital data. The identifying module 12 is used for identifying the digital data. The saving module 13 is used for saving the digital data as a temporary file. The receiving module 14 is used for receiving a request to select at least one target medium (such as a CD, a DVD, or a BD), wherein the at least one target medium is used for storing the digital data. The determining module 15 is used for determining a quantity of the at least one target medium. Furthermore, the total size of the digital data can be identified by the identifying module 12, so the quantity of the target medium can be determined according to the total size of the digital data and the capacity of each target medium. The writing module 16 is used for writing the digital data into the at least target medium in a specific order. When there is more than one target medium, because the digital data in the target mediums is in the specific order, the user may restore the digital data back into the computer 100 without any order. Furthermore, if required, the user may need only one target medium to be restored into the computer 100, it is convenient to find one target medium instead of all target mediums.

Figure 7:
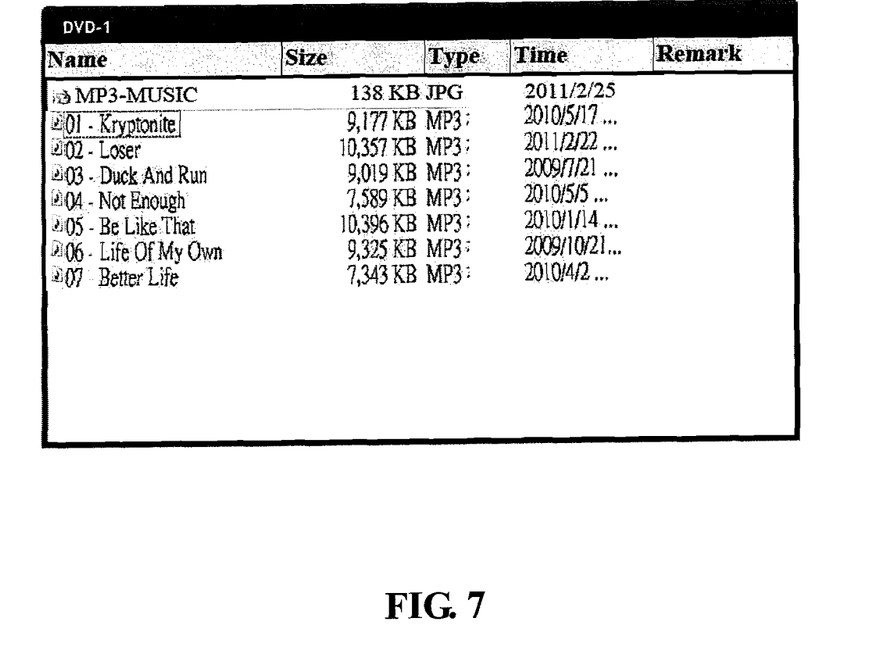
FIG. 7 illustrates an example of list text file according to the present invention.
Figure 8:
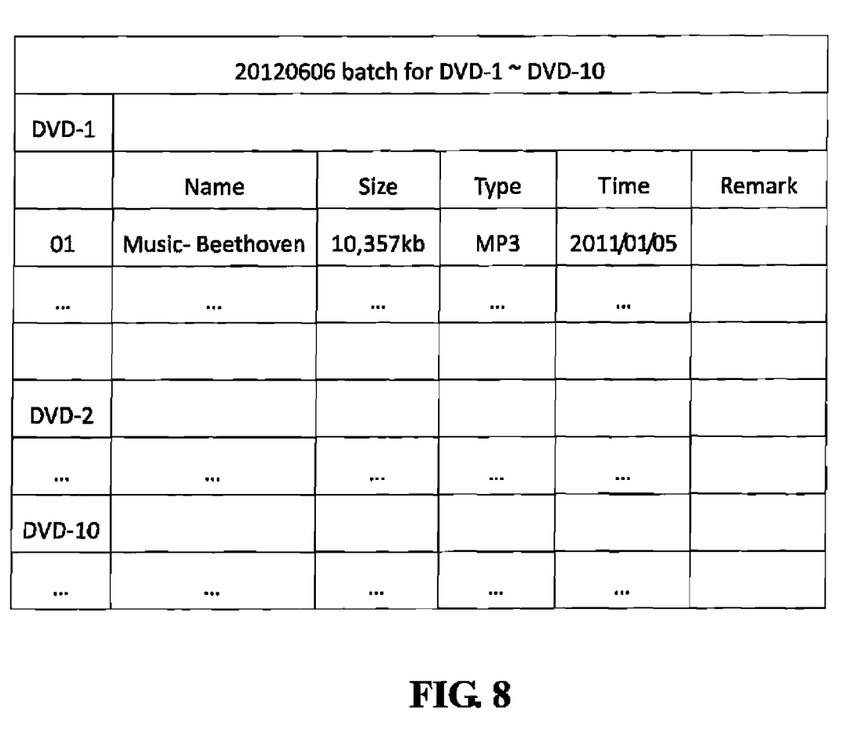
FIG. 8 illustrates an example of index text file according to the present invention.

The reproducing system 1 for mediums further comprises a building module 17 for building an index database of the digital data. An index managing module 18 connected with the writing module 16 for generating a list text file (as shown in FIG. 7) and an index text file (as shown in FIG. 8). In this embodiment, the index database comprises a file name, a filename extension, a size, a date, a time, an attribute, a type, and a remark. In the preferred embodiment, the packaging module 19 is used for packing the digital data into one compressed file. The target medium comprises a CD, a DVD, or a BD. Thus, when the digital data is too large to be stored into one target medium, it is required to compress the digital data or to divide the compressed file.

Figure 4:
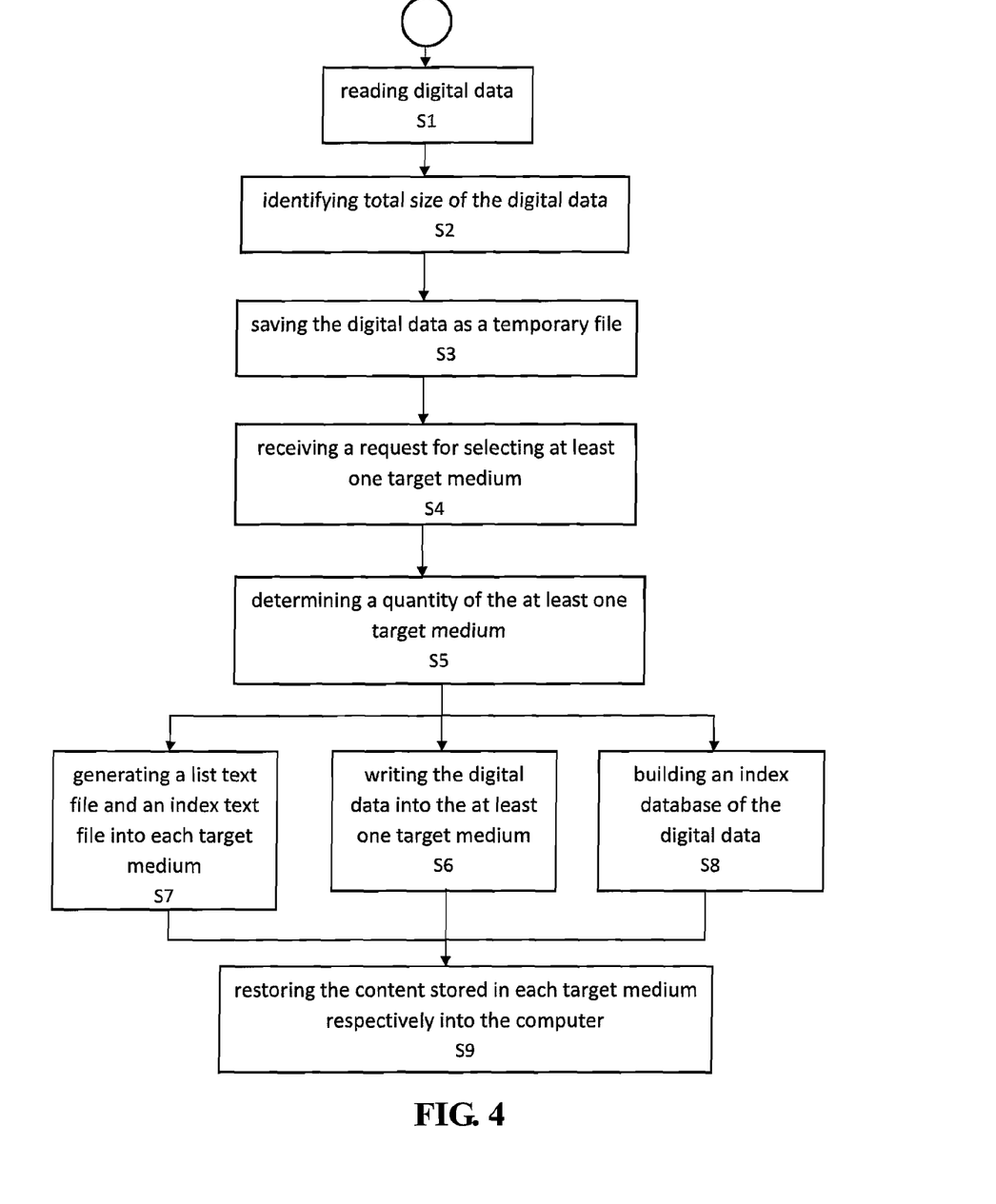
FIG. 4 shows a flow chart according to the method of the present invention.

Since the technical details of the identifying module 12, saving module 13, and packaging module 19 are known to those skilled in the art, we omit the description The present invention also provides a method for reproducing digital data and identifying the same by executing a software program stored in a memory of a computer. Please refer to FIG. 4, which shows a flow chart of the method according to the present invention.

S1: reading digital data according to a selection from an interface. For example, a user may use the source medium processing device 211 (as shown in FIG. 1) to read his/her digital data.

S2: identifying total size of the digital data. As described above, the identifying module 12 (as shown in FIG. 3) can be used to identify the digital data and a total size thereof.

S3: saving the digital data as a temporary file. The saving module 13 in FIG. 3 can be used to save the digital data as the temporary file, wherein the temporary file is to be written into another medium.

Figure 5:
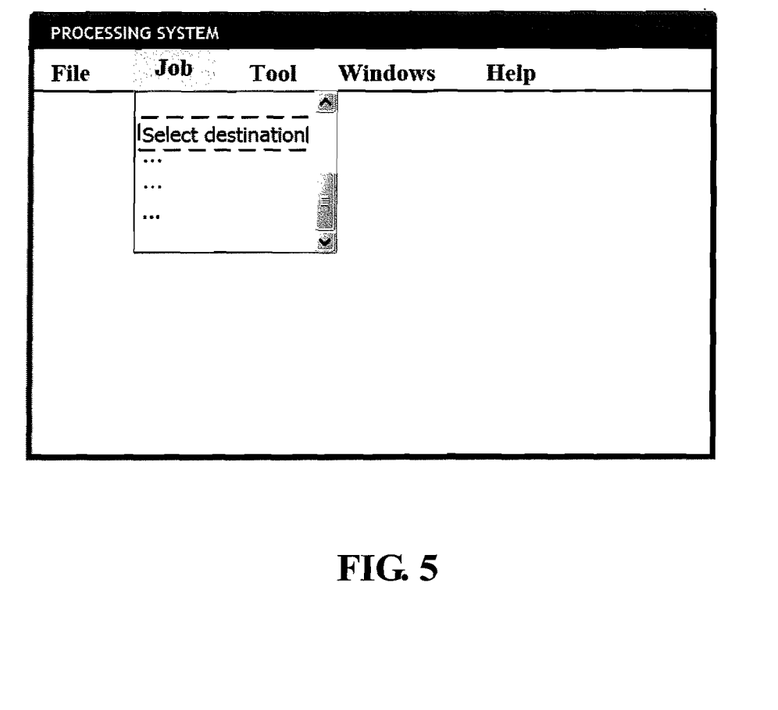
FIG. 5 and FIG. 6 illustrate interfaces according to one example of the present invention.
Figure 6:
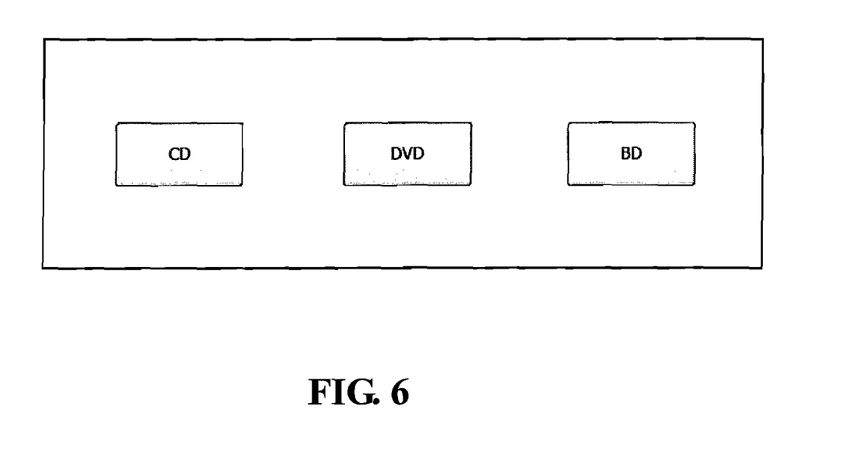

S4: receiving a request for selecting at least one target medium, wherein the target medium is used for storing the digital data. For example, the user can use an input device 130 (as shown in FIG. 2) to select at least one target medium through an interface displayed on a display 140 (as shown in FIG. 2). Please refer to FIG. 5 and FIG. 6, which show an example of interfaces. When the user clicks on "job" (a destination), as shown in FIG. 5, the user can select a specific type of target medium through the interface shown in FIG. 6.

For example, the specific type of target medium may comprise a CD, DVD, or BD. A capacity of each target medium can also be identified by the identifying module 12.

S5: determining a quantity of the at least one target medium to be used for writing according to the total size of the digital data and a capacity of each target medium. The identifying module 12 can identify the total size of the digital data and the capacity of each target medium, so the determining module 15 can determine the quantity of target medium that will be needed for writing the digital data into the target medium(s).

S6: writing the digital data into the at least one target medium in a specific order. For example, there are 1,000 CDs of digital data to be reproduced into 3 BDs and 20 DVDs. Thus, the space for storing the mediums after reproduction can be reduced dramatically. Furthermore, when there is more than one target medium, the digital data written into the target medium is in the specific order automatically.

S7: generating a list text file and an index text file into each target medium, wherein the list text file comprises information regarding to the content stored in each target medium respectively and the index text file comprises information regarding to the content in all target medium. As shown in FIG. 7, the list text file comprises information regarding to the content stored in each target medium respectively. As shown in FIG. 8, the index text file comprises information regarding to the content in all target mediums. For example, when the digital data is stored into 10 target mediums (such as DVD-1 till DVD-10) in a specific order, according to the present invention, the list text file in DVD-1 shows the content of DVD-1 and the index text file in DVD-1 shows all digital data from DVD-1 till DVD-10.

S8: building an index database of the digital data. The building module 17 in FIG. 3 can be used to build an index database of the digital data in the computer 100. For example, folders can be displayed after building the index database. When the folder is clicked, a file name, a filename extension, a size, a date, a time, an attribute, a type, and a remark can be displayed. Thus, it is very convenient for the user to know the content of the target mediums after reproducing the digital data.

In a preferred embodiment, the method further comprises:

S9: restoring the content stored in each target medium respectively into the computer. Because the digital data written into the target medium(s) is in the specific order automatically, it is convenient to restore the content of the target mediums into the computer or the source medium without any order.

Although the present invention has been explained in relation to its preferred embodiments, it is to be understood that many other possible modifications and variations can be made without departing from the spirit and scope of the invention as hereinafter claimed.

What is claimed is:

1. A reproducing system for mediums comprising:
a reading module for reading digital data;
an identifying module connected with the reading module for identifying the total size of the digital data;
a receiving module connected with the identifying module for receiving a request to select at least one target medium, wherein the at least one target medium is used for storing the digital data;
a determining module connected with the identifying module and the receiving module respectively for determining a quantity of the target medium to be used for writing according to the total size of the digital data and a capacity of each target medium;
a saving module connected with the identifying module for saving the digital data as a temporary file;
a writing module connected with the determining module and the saving module for writing the digital data into the at least one target medium in a specific order;
an index managing module connected with the writing module for generating a list text file and an index text file into each target medium, wherein the list text file comprises information regarding to the content stored in each target medium respectively and the index text file comprises information regarding to the content in all target medium; and
a building module connected with the index managing module for building an index database of the digital data.

2. The reproducing system for mediums of claim 1 further comprising a restoring module connected with the writing module, the index managing module, and the building module for restoring the content stored in each target medium respectively.

3. The reproducing system for mediums of claim 1 further comprising a packaging module connected with the reading module for packing the digital data into one compressed file.

4. The reproducing system for mediums of claim 1, wherein the index database comprises a file name, a filename extension, a size, a date, a time, an attribute, a type, and a remark.

5. The reproducing system for mediums of claim 1, wherein the at least one target medium comprises a CD, a DVD, or a BD.

6. A method for reproducing digital data and identifying the same by executing a software program stored in a memory of a computer, the method comprising:
reading digital data according to a selection from an interface;
identifying total size of the digital data;
saving the digital data as a temporary file;
receiving a request for selecting at least one target medium, wherein the target medium is used for storing the digital data;
determining a quantity of the at least one target medium to be used for writing according to the total size of the digital data and a capacity of each target medium;
writing the digital data into the at least one target medium;
generating a list text file and an index text file into each target medium, wherein the list text file comprises information regarding to the content stored in each target medium respectively and the index text file comprises information regarding to the content in all target medium; and
building an index database of the digital data.

7. The method of claim 6 further comprising:
restoring the content stored in each target medium respectively into the computer.

* * * * *